United States Patent
Rahman et al.

(10) Patent No.: US 11,276,135 B2
(45) Date of Patent: *Mar. 15, 2022

(54) PARALLEL DATA TRANSFER TO INCREASE BANDWIDTH FOR ACCELERATED PROCESSING DEVICES (71) Applicant: ATI Technologies ULC, Markham (CA)

(72) Inventors: Syed Arshad Rahman, Markham (CA); Michael I. Hvizdos, Markham (CA); Leonid Shamis, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,815

(22) Filed: Apr. 23, 2020

(65) Prior Publication Data
US 2020/0258187 A1 Aug. 13, 2020

Related U.S. Application Data (63) Continuation of application No. 15/843,663, filed on Dec. 15, 2017, now Pat. No. 10,672,095.

(51) Int. Cl.
*G06T 1/20* (2006.01)
*G06F 9/38* (2018.01)
(Continued)

(52) U.S. Cl.
CPC .............. *G06T 1/20* (2013.01); *G06F 9/3887* (2013.01); *G06F 9/4881* (2013.01);
(Continued)

(58) Field of Classification Search
CPC ....... G06T 1/20; G06F 9/3887; G06F 9/4881; G06F 13/1652; G06F 13/4221; G06F 2213/0026
See application file for complete search history.

(56) References Cited

U.S. PATENT DOCUMENTS 6,963,944 B1 * 11/2005 Rettig ................... H04L 12/403
710/105
7,528,838 B2 5/2009 Gosalia et al.
(Continued)

FOREIGN PATENT DOCUMENTS

CN 105117170 A 2/2015

OTHER PUBLICATIONS

"Efficient Inter-node MPI Communication Using GPUDirect RDMA for InfiniBand Clusters with NVIDIA GPUs"; Potluri Sreeram et al.; IEEE International Conference on Parallel Processing; Oct. 1, 2013; pp. 80-89; XP032534658.
(Continued)

*Primary Examiner* — Henry Tsai
*Assistant Examiner* — Aurangzeb Hassan
(74) *Attorney, Agent, or Firm* — Volpe Koenig (57) ABSTRACT

Techniques for improving data transfer in a system having multiple accelerated processing devices ("APDs") are described herein. In such a system, multiple APDs are coupled to a processor (e.g., a central processing unit ("CPU")) via a general interconnect fabric and to each other via a high speed interconnect. The techniques herein increase the effective bandwidth for transfer of data between the CPU and the APD by transmitting data to both APDs through the portion of the interconnect fabric coupled to each respective APD. Then, one of the APDs transfers data to the other APD or to the processor via the high speed inter-APD interconnect. Although data transferred "indirectly" through the helper APD takes slightly more time to be transferred than a direct transfer, the total effective bandwidth to the target is increased due to the high-speed inter-APD interconnect.

20 Claims, 6 Drawing Sheets

(51) Int. Cl.
*G06F 9/48* (2006.01)
*G06F 13/16* (2006.01)
*G06F 13/42* (2006.01)

(52) U.S. Cl.
CPC ...... *G06F 13/1652* (2013.01); *G06F 13/4221* (2013.01); *G06F 2213/0026* (2013.01)

(56) References Cited

U.S. PATENT DOCUMENTS

| | | | |
|---|---|---|---|
| 8,516,454 B2 | 8/2013 | Mizrachi et al. | |
| 9,379,908 B2 | 6/2016 | Ramaswami et al. | |
| 9,733,978 B2 | 8/2017 | Suarez et al. | |
| 2007/0180309 A1* | 8/2007 | Zohar | G06F 11/2058 714/6.12 |
| 2008/0028103 A1 | 1/2008 | Schiansker et al. | |
| 2012/0162234 A1* | 6/2012 | Blinzer | G06F 9/30003 345/501 |
| 2013/0041969 A1 | 2/2013 | Falco et al. | |
| 2014/0040532 A1 | 2/2014 | Watanabe et al. | |
| 2014/0104935 A1* | 4/2014 | Ware | G11C 7/1087 365/154 |
| 2014/0254431 A1* | 9/2014 | Yan | H04Q 11/04 370/255 |
| 2014/0256339 A1* | 9/2014 | Lim | H04W 76/15 455/452.1 |
| 2015/0288510 A1* | 10/2015 | Chen | H04L 5/14 370/294 |
| 2015/0323956 A1* | 11/2015 | Goyal | G06F 11/0745 713/600 |
| 2017/0374588 A1* | 12/2017 | Guo | H04B 17/382 |
| 2018/0060269 A1* | 3/2018 | Kessler | G06F 13/4022 |
| 2019/0018699 A1 | 1/2019 | Asaro et al. | |

OTHER PUBLICATIONS

"Available Bandwidth Probing for path selection in heterogeneous home Networks"; Oscar Olvera-Irigoyen et al.; IEEE Globecom Workshops, Anaheim, CA; Dec. 3, 2012; pp. 492-497; XP032341422.
"NVIDIA NVLink TM High-Speed Interconnect: Application Performance Contents"; Anonymous; In: "NVIDIA Whitebooks"; Nov. 1, 2014; pp. 1-19; XP55827012.

* cited by examiner

PARALLEL DATA TRANSFER TO INCREASE BANDWIDTH FOR ACCELERATED PROCESSING DEVICES

CROSS REFERENCE TO RELATED APPLICATIONS

This application is a continuation of U.S. patent application Ser. No. 15/843,663 filed on Dec. 15, 2017, which is incorporated by reference herein in its entirety.

BACKGROUND

Accelerated processing devices ("APDs") include hardware for performing tasks such as rendering graphics. Some computer systems include multiple APDs. The inclusion of multiple APDs is intended to speed up the tasks performed by the APDs. However, due to the complexities in designing software configured to take advantage of the presence of multiple APDs, computer systems often do not utilize the full potential of multi-APD systems.

BRIEF DESCRIPTION OF THE DRAWINGS

A more detailed understanding can be had from the following description, given by way of example in conjunction with the accompanying drawings wherein.

DETAILED DESCRIPTION

Techniques for improving data transfer in a system having multiple accelerated processing devices ("APDs") are described herein. In such a system, multiple APDs are coupled to a processor (e.g., a central processing unit ("CPU")) via a general interconnect fabric such as peripheral component interconnect express ("PCIe"). Each APD is coupled to the processor with a particular portion of the interconnect fabric (such as a specific number of PCIe lanes). Each portion of the fabric has its own data characteristics such as maximum bandwidth and the like (for example, a particular number of PCIe lanes coupled to one of the APDs would have a particular maximum bandwidth). In addition, the APDs are coupled to each other via a high speed interconnect (such as AMD's inter-chip global memory interconnect ("XGMI")).

It is possible for work on a particular APD to be constrained by the speed of the assigned portion of the interconnect fabric (such as the PCIe connection assigned to that APD). More specifically, it is possible for work on the APD to be processed more quickly than work can be transferred over the PCIe connection to the APD. The techniques herein increase the effective bandwidth for transfer of data from the CPU to the APD and/or from the APD to the CPU through cooperation of one or more other APDs in a multi-APD system. For a write to a "target" APD, the technique involves transmitting data both directly to the target APD as well as indirectly to the target APD through one or more other APDs (designated as "helper" APDs). The one or more helper APDs then transmit the data to the target APD through a high speed inter-APD interconnect. Although data transferred "indirectly" through the helper APD may take more time to be transferred to the target APD than a direct transfer, the total effective bandwidth to the target APD is increased due to the high-speed inter-APD interconnect. For a read operation from a "source" APD, the technique is similar, but reversed. More specifically, the technique involves transmitting data from the source APD to the processor, both directly, as well as indirectly through one or more helper APDs. A "source" APD—that is, an APD involved in a read operation from the processor 102—may also be referred to sometimes herein as a "target" APD.

Figure 1:
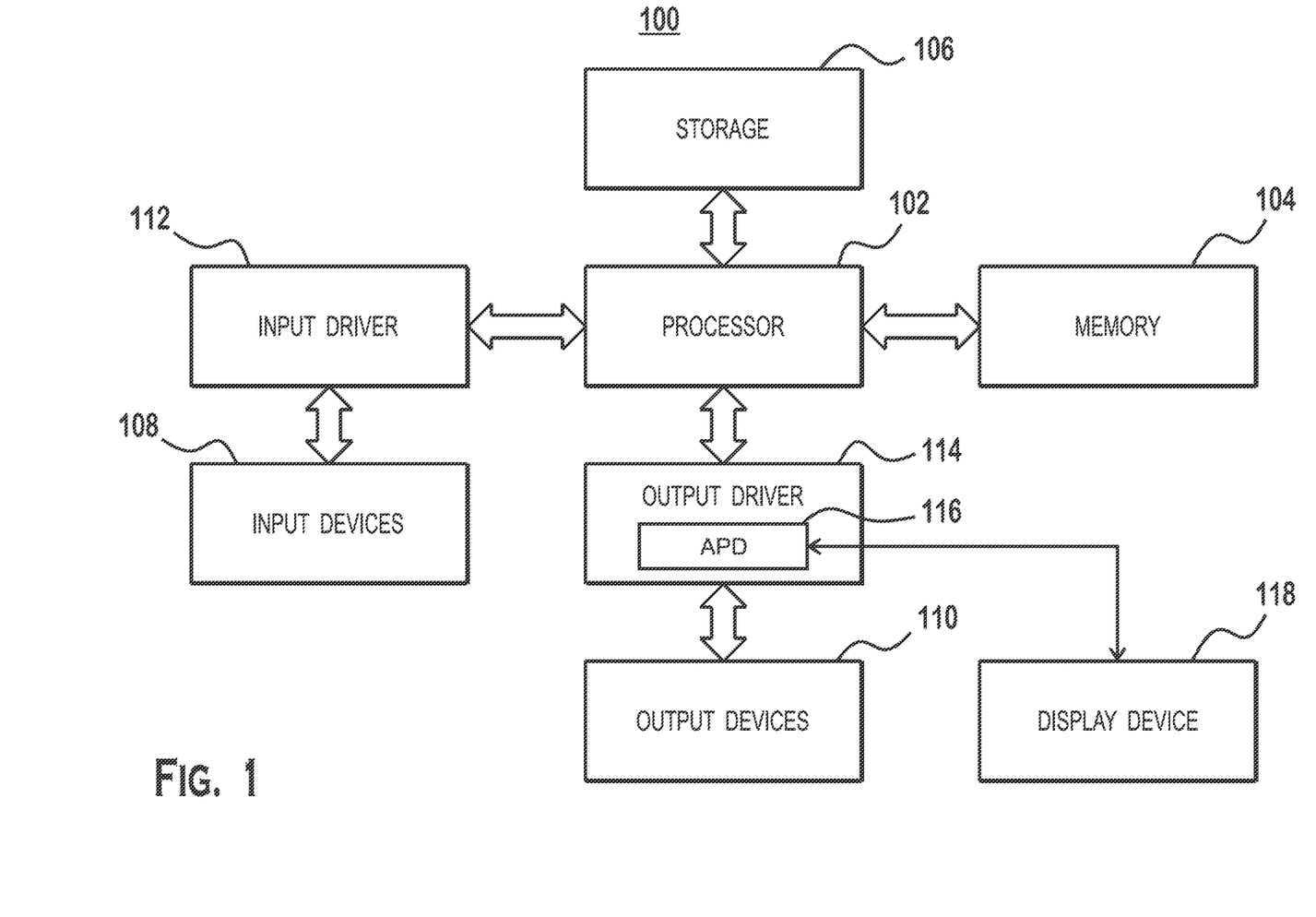
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 illustrated and described is an example and can include additional components not shown in FIG. 1, or may omit one or more components illustrated in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display, and/or to produce other output such as compute results stored to a memory and/or to produce results for other operations such as media encoding and decoding. Although certain types of workloads are described herein as being performed by the APD 116, those of skill in the art will understand that other types of workloads could alternatively or additionally be performed by the APD 116. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
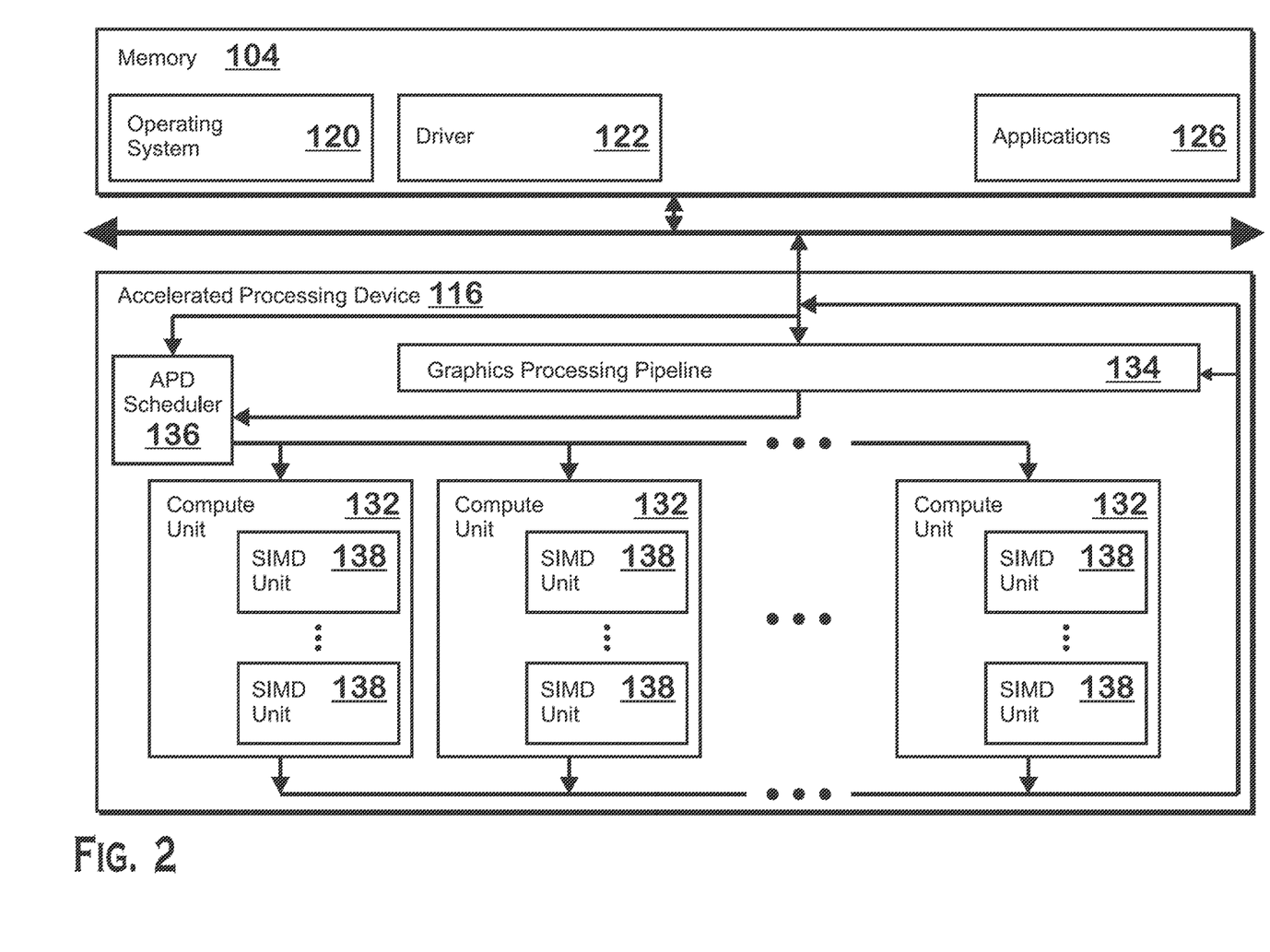
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes shader engines 131, each of which includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
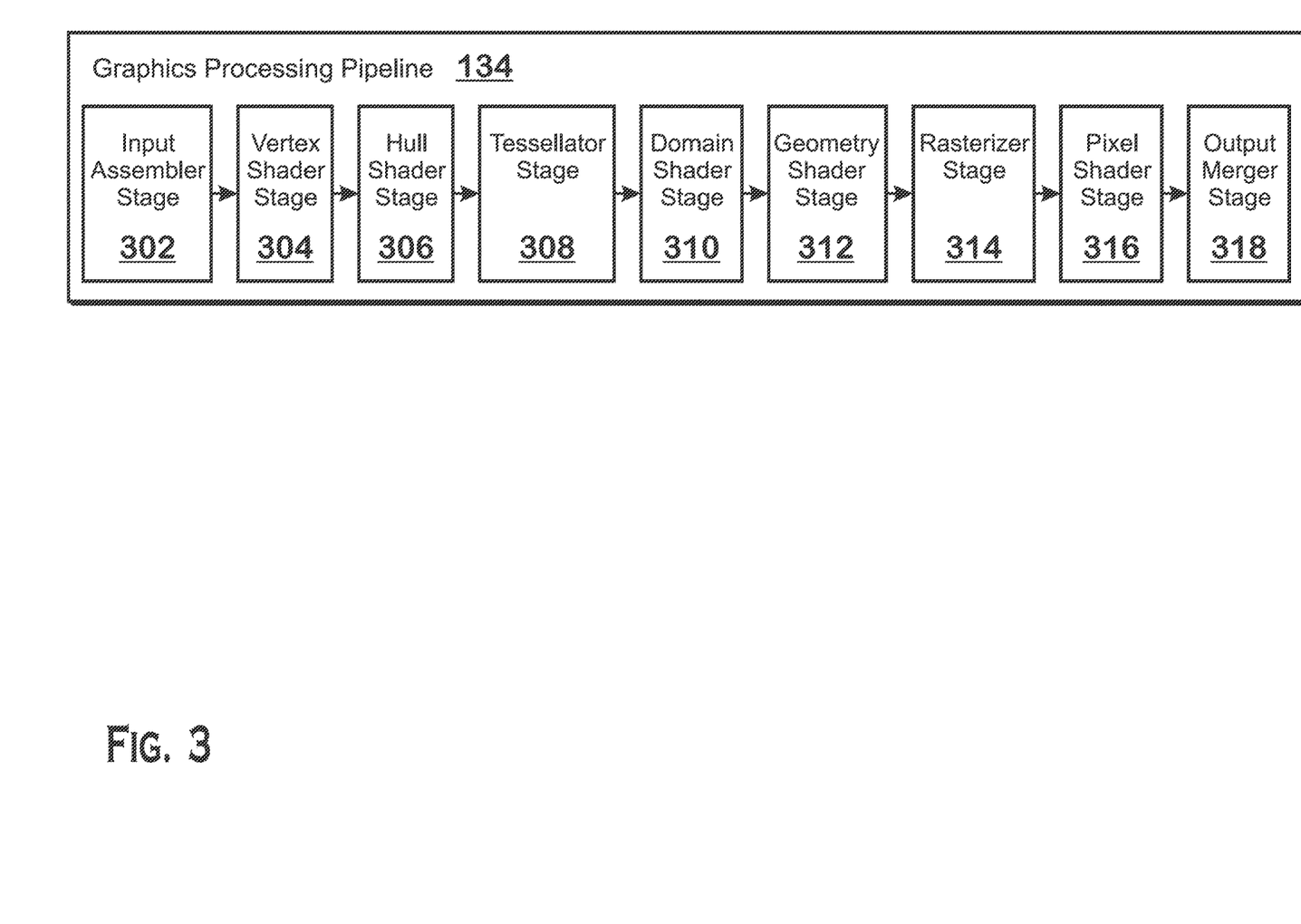
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Some computer systems 100 include multiple APDs 116 that may cooperate to render images for display. Part of the cooperation includes transmitting data between the multiple APDs 116. A dedicated link (for example, AMD's inter-chip global memory interconnect (XGMI)) provides high-speed intercommunication between the multiple APDs 116.

Figure 4:
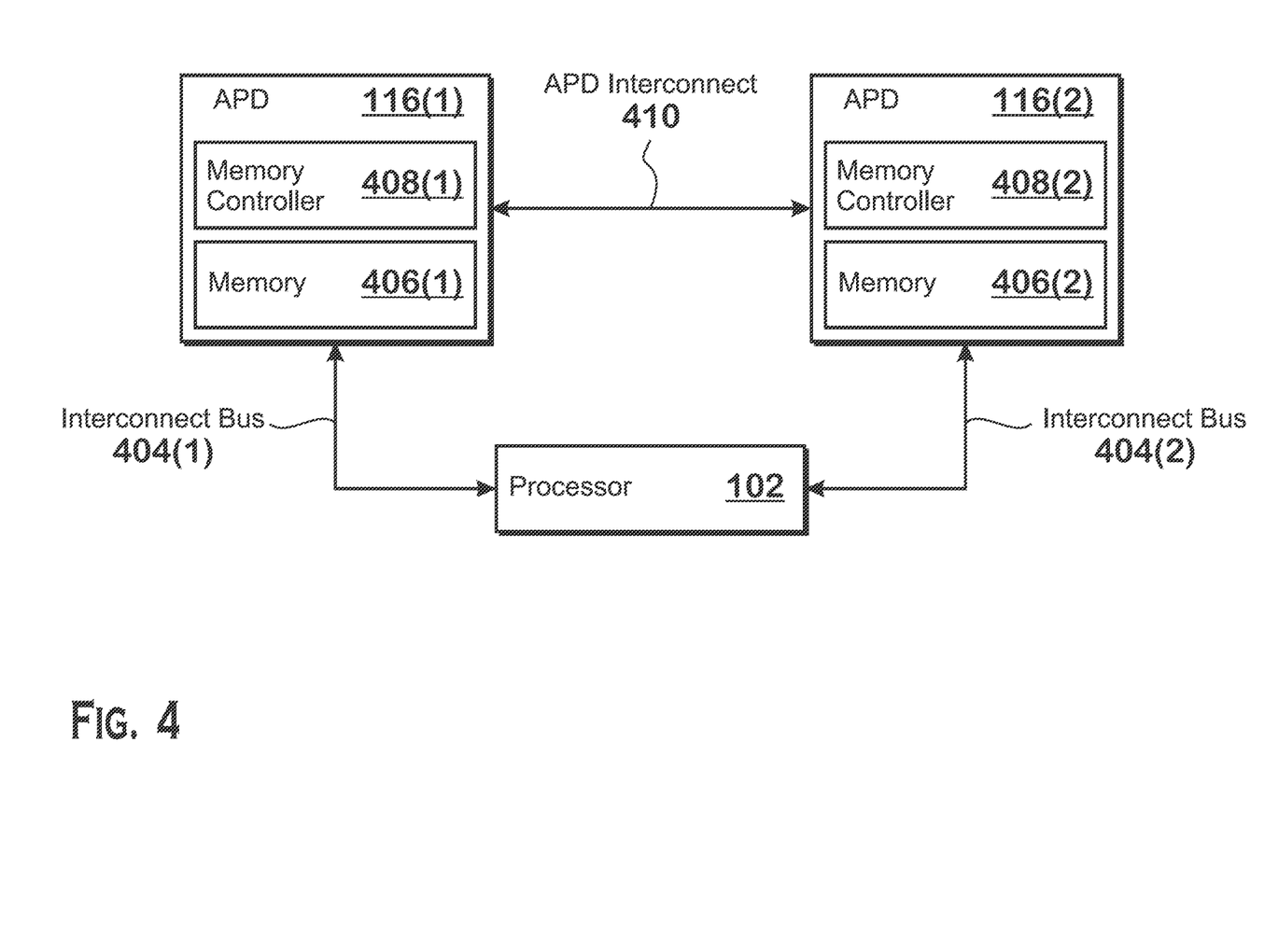
FIG. 4 illustrates a configuration of the system of FIG. 1 that includes two APDs and an APD interconnect, according to an example.

FIG. 4 illustrates a configuration of the system 100 that includes two APDs 116-APD 116(1) and APD 116(2)—and an APD interconnect 410, according to an example. APD 116(1) is coupled to the processor 102 via an interconnect bus 404(1). APD 116(2) is also coupled to the processor 102 via an interconnect bus 404(2). In some examples, the interconnect bus is a PCIe bus, with APD 116(1) coupled to different PCIe lanes than APD 116(2). The interconnect bus 404(1) conveys data independently of the interconnect bus 404(2), meaning that the bandwidth of the interconnect bus 404(1) is not consumed by data transfer over the interconnect bus 404(2) and the bandwidth of the interconnect bus 404(2) is not consumed by data transfer over the interconnect bus 404(1).

As described elsewhere herein, the APD interconnect 410 provides a data transfer link between the APDs 116. In various examples, the APD interconnect 410 is used to transfer data for rendering images or for other purposes, such as for purposes unrelated to three dimensional graphics rendering. The data transferred over the APD interconnect 410 includes data such as pixel data, geometry data, or other data for rendering images or performing other work such as non-graphics-related work. In some examples, the APD interconnect 410 has a greater bandwidth than the interconnect bus 404 to allow for high speed transfer of such data.

Each APD 116 also includes a memory 406 and a memory controller 408. Each memory 406 is local memory that is "local to" and thus associated with a respective APD 116. In some implementations, a memory 406 that is associated with an APD 116 acts as a general data store for that APD 116 providing access timing characteristics that are advantageous as compared with memory not specifically associated with that APD 116 (such as memory 104). Such memory 406 typically stores data for the compute units 132, the graphics processing pipeline 134, and/or other elements within the APDs 116. Each APD 116 also includes a memory controller 408. Among other things, the memory controller 408 controls memory accesses to the memory 406, as well as other elements within the APDs 116, across both the APD interconnect 410 and the interconnect bus 404.

One type of transaction that the memory controller 408 controls is memory accesses that specify a system memory address that is mapped to the local memory 406 of the associated APD 116. That a system address is mapped to the local memory 406 means that the memory controller 408 routes transactions directed to system address to the device associated with the local memory 406. In an example, the memory controller 408 controls such memory transactions by including a set of registers that indicates an "aperture" or portion of the system memory address space mapped to the APD 116 so that the interconnect bus 404 "knows" to route memory transactions specifying system memory addresses within the aperture to the APD 116. The memory controller 408 also includes internal mappings that map addresses of the system memory to local memory addresses of the local memory 406.

It is possible for the memory controller 408 to specify that addresses in the system memory mapped to the APD 116 (a "first" APD 116) are further mapped to a local memory 406 of a different APD 116 (a "second" APD 116). For example, it is possible for PCIe configuration registers to specify apertures of the system memory that "belong" to the APD 116, and at the same time, it is possible for the memory controller 408 to include mappings of at least a portion of the addresses within that aperture to local memory 406 of the second APD 116. In that instance, in response to the first APD 116 (e.g., APD 116(1)) receiving data directed at an address mapped to the second APD 116 (e.g., APD 116(2)), the first APD 116 (e.g., APD 116(1)) forwards that data to the second APD 116 (e.g., APD 116(2)). In some implementations, this forwarding occurs over the APD interconnect 410.

It is also possible for the memory controller 408 of an APD 116 (e.g., APD 116(1)) to be programmed to transfer data over the APD interconnect 410 to the other APD 116 (e.g., APD 116(2)). More specifically, the processor 102 transmits configuration data and/or computer instructions causing the memory controller 408 (e.g., memory controller 408(1)) to be configured to perform the transfer upon receiving data directed to specific memory addresses. When configured in this manner, in response to an APD 116 (e.g., APD 116(1)) receiving data mapped to such a specific memory address in the local memory 406 (e.g., local memory 406(1)) associated with that APD 116 (e.g., APD 116(1)), that data is written to that local memory 406 (e.g., local memory 406(1)). The memory controller 408 (e.g., memory controller 408(1)) associated with that APD 116 (e.g., APD 116(1)) copies the data written to that local memory 406 (e.g., local memory 406(1)) to the other APD 116 (e.g., APD 116(2)) via the APD interconnect 410. That other APD 116 (e.g., APD 116(2)) writes that data into the local memory 406 (e.g., local memory 406(2)) associated with that other APD 116 (e.g., APD 116(2)).

The above operations may also occur in the reverse direction. In other words, it is of course possible for APDs 116 to transmit data to the processor 102. Such a transfer can occur, for example, in response to a write request by the APD 116 that requests data transfer to the processor 102 or in response to a read request by the processor 102 that requests data transfer to the processor 102. Additionally, a transfer from an APD 116 to a processor 102 can use one or more other APDs 116 as intermediaries. An APD can be configured to be used as an intermediary for such transfers ("reads" by the processor 102) in a similar manner as with transfers in the other direction ("writes" by the processor 102). More specifically, in response to a read, an APD 116 can be configured to transfer data for writing to the memory of an intermediary APD 116 which is configured to relay such data to the processor 102. Alternatively, the APD 116 is configured to write to memory addresses mapped to the intermediary APD 116 and such intermediary APD 116 is configured to map the written-to addresses to system memory for the processor 102.

As described herein, an APD 116 receives commands from the processor 102 and processes those commands. In some examples, some of these commands include commands to render three-dimensional objects to an image for display on a screen. The processor 102 may also send other types of commands to the APD 116. In some modes of operation, two or more APDs 116 cooperate to render images for display to a screen. Various options for dividing work for rendering images exist, including splitting the work for rendering individual images between the different APDs 116, assigning different whole frames to different APDs 116, or other techniques. In other examples, each APDs 116 performs at least some work unrelated to work performed by another APD 116, and/or one or more APDs 116 perform work unrelated to 3D graphics (i.e., unrelated to rendering work).

It is also possible that, despite the presence of two or more APDs 116 within a computer system, software executing on the computer system is not designed to take advantage of the multiple APDs 116. In an example, an application is written to transfer rendering commands (and/or other types of commands such as commands to execute a compute shader) and data for processing to a single APD 116. Applications are sometimes written in this manner because the developers lack the resources or do not wish to spend the resources to configure the application to make use of multiple APDs 116. It is also possible for two or more APDs 116 present in a system to consume different amounts of bandwidth over respective interconnect busses 404, even in situations when the APD 116 are being used for some amount of work. For example, it is possible for work on a first APD 116 to be constrained by the bandwidth of the interconnect bus 404 while work on a second APD 116 (and/or third, fourth, etc., APD 116) is not constrained by the bandwidth of the interconnect bus 404, meaning that there is spare bandwidth on the interconnect bus 404 associated with the second APD 116.

Figure 5A:
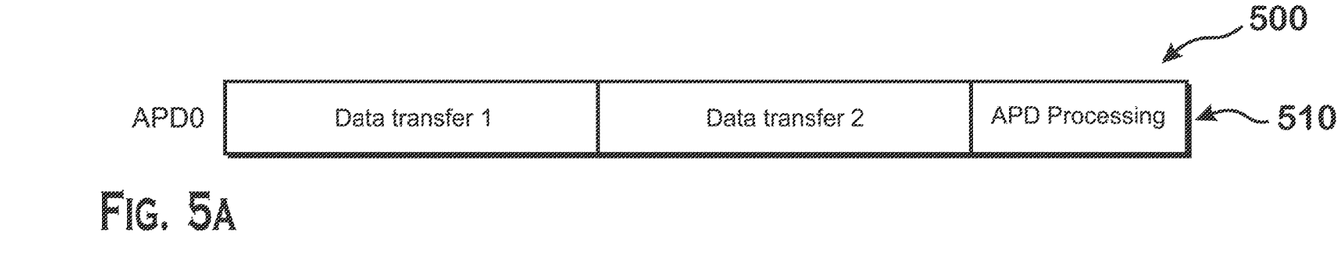
FIGS. 5A-5C illustrate example techniques for utilizing one APD to improve the capabilities of another APD.
Figure 5B:
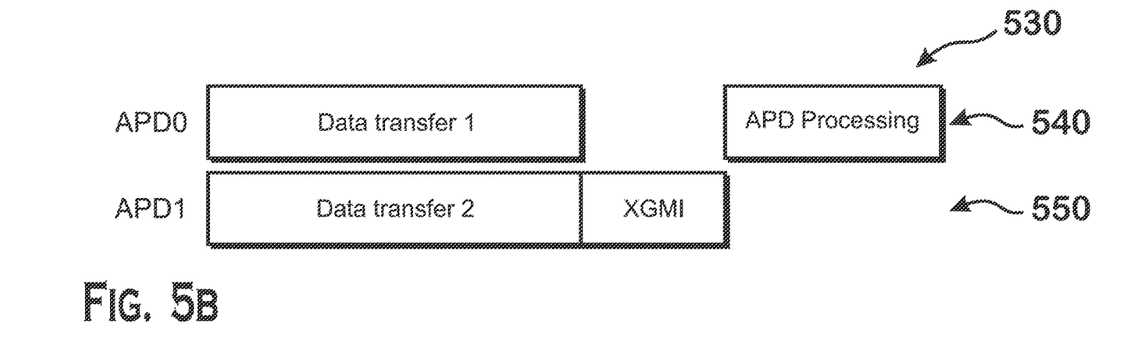
Figure 5C:
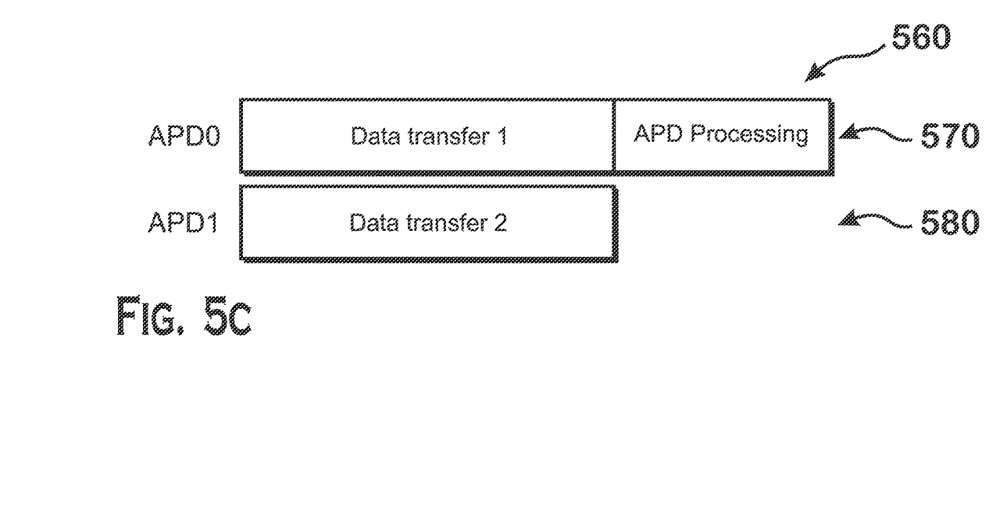

Regardless of the reason, it is possible for bandwidth of an interconnect bus 404 coupled to one APD 116 to be underutilized while an interconnect bus 404 coupled to another APD 116 is more utilized or fully utilized. Thus FIGS. 5A-5C illustrate techniques for utilizing one APD 116 to improve the capabilities of another APD 116. Specifically, FIGS. 5B-5C illustrate techniques by which a "helper" APD 116 assists with transmitting data to a "target" APD 116 utilizing the high-speed APD interconnect 410. Note that although a single "helper" APD 116 is illustrated, the techniques described herein may be extended to a system in which multiple helper APDs 116 are used to increase the effective bandwidth of a "target" APD 116. For illustrative purposes, and for reasons of simplicity of explanation, the operation illustrated in FIGS. 5A-5C is one in which a large set of data (the accumulation of data transfer 1 and data transfer 2) is transferred to a target APD for processing and in which the APD processing is only able to begin processing once all of that data has been received. However, it should be understood that the techniques described herein for increasing the effective bandwidth between a processor 102 and an APD 116 are not limited to such a scenario and can be used at any time that a helper APD is available (i.e., has spare bandwidth).

FIG. 5A illustrates a timing diagram 500 in which a helper APD 116 is not used to assist the target APD 116. More specifically, the timing diagram 500 illustrates a timing row 510. The timing row 510 illustrates three operations performed by a first APD 116, labeled APD 0 in FIG. 5A (no timing row for a helper APD is illustrated in FIG. 5A). The first operation, labeled data transfer 1, corresponds to transfer of a first set of data from the processor 102 to the first APD 116. This first data transfer takes a certain amount of time dictated by the data transfer characteristics of the interconnect bus 404, such as bandwidth, and the amount of data. A second data transfer, labeled data transfer 2, is also made. Data transfer 2 corresponds to transfer of a second set of data from the processor 102 to the first APD 116. Because substantially all of the data transfer resources (e.g., bandwidth) are consumed during data transfer 1, data transfer 2 waits until data transfer 1 is substantially complete before beginning. In one example, the interconnect bus 404 includes one or more lanes of a PCIe connection and data transfer 1 occurs over all of the PCIe lanes included in the interconnect bus 404, which are therefore unavailable for data transfer 2. APD processing is shown to the right of data transfer 2, indicating that APD processing occurs after data transfer 2. In other words, APD processing does not begin until after data transfer 2 completes. It is of course possible for APD processing to begin before that. However, FIG. 5A illustrates that the data transfers occur serially and there is thus a minimum amount of time required for transfer of data for both data transfer 1 and data transfer 2.

FIG. 5B illustrates a timing diagram 530 for an example technique in which data is transferred to each of two APDs 116 and then one of the APDs 116 transfers the data received to the other APD 116 via a high speed APD interconnect 410. One of the APDs 116 is referred to as a "target APD," illustrated as "APD0," and is the APD designated by the application to perform work (such as rendering work involving the data). The other APD 116 is referred to as a "helper APD," illustrated as "APD1," and is the APD designated to assist with transferring data to the target APD for performing the work.

In the technique of FIG. 5B, the processor 102 transmits data to both APD0 and APD1 in an overlapping period of time. More specifically, an application 126 provides commands and data to the driver 122 for transmission to the target APD for processing (e.g., by calling functions of an application programming interface provided by the driver 122). The application 126 does not specify that more than one APD 116 is to be used to process the commands and data. In response, the driver 122 transfers data to both the helper APD and the target APD, and configures the helper APD to transfer the data received by the helper APD to the target APD. More specifically, the driver 122 splits the data and commands specified by the application 126 into two (or more, depending on the number of APDs participating) portions, transmits one portion to the target APD and transmits the other portion to the helper APD (or the other multiple portions to the multiple helper APDs if present). The helper APD (or APDs if multiple are present) transmits that other portion to the target APD over the APD interconnect 410.

In FIG. 5B, the technique includes writing data into the local memory 406 of the helper APD and then copying the data from the local memory of the helper APD (e.g., by the memory controller 408) to the target APD. To perform this copy, the driver 122 configures the helper APD so that in response to receiving the data from the processor 102, the helper APD copies that data to the target APD. In various examples, the driver 122 configures the helper APD in this manner by setting configuration registers in the helper APD, transmitting firmware instructions, or in any other technically feasible manner.

As shown in row 540, data transfer 1 occurs during a first time. Data transfer 1 includes transferring data over an interconnect bus 404 to APD0, the target APD. In addition, as shown in row 550, data transfer 2 occurs in a time period that overlaps with the first time in which data transfer 1 occurs. The time period overlapping with the first time means that at least some of data transfer 1 occurs at the same time as data transfer 2. In some examples, a substantial portion of data transfer 1 overlaps data transfer 2 in time. In one example, the driver 122 splits the data specified to be transferred to the target APD roughly in half. In that situation, assuming the interconnect busses 404 for the two APDs have similar transmission characteristics (e.g., similar bandwidth or the like), the amount of time for transmitting the data split roughly in half is approximately equal.

Note that because the interconnect busses 404 coupled to the two different APDs 116 are independent, in the sense that bandwidth consumed on one interconnect bus 404 does not consume any bandwidth on another interconnect bus 404, the data transfer may occur independently and simultaneously to both the target APD and the helper APD. In other words, the processor 102 transmits first data to the target APD at the same time the processor 102 transmits second data to the helper APD. Thus the serialized transfer of data illustrated in FIG. 5A does not occur. Of course, the data transmitted to the helper APD still must be transferred to the target APD. However, this occurs over the APD interconnect 410. If the data transfer speed over the APD interconnect 410 is higher than the data transfer speed over the interconnect bus 404, then the total time needed to transfer both the data transferred to the target APD and to the helper APD is less in the technique of FIG. 5B than the total time needed to transfer both data in the technique of FIG. 5A.

FIG. 5C illustrates a timing diagram 5C for another example technique in which data is transferred to each of two APDs 116 and then one of the APDs 116 transfers the data received to the other APD 116. As with FIG. 5B, the discussion of FIG. 5C refers to the APD 116 that receives and processes the data from the processor 102 as the "target APD," which is indicated as APD0 in FIG. 5C. Additionally, the discussion of FIG. 5C refers to the APD 116 that assists with transferring data to the target APD as the "helper APD," shown as APD1 in FIG. 5C.

As with the technique of FIG. 5B, in the technique of FIG. 5C, an application 126 provides commands and data to the driver 122 for transmission to the target APD for processing (e.g., by calling functions of an application programming interface provided by the driver 122). The application 126 does not specify that more than one APD 116 is to be used to process the commands and data. In response, the driver 122 transfers data to both the helper APD and the target APD, and configures the helper APD 116 to transfer the data received by the helper APD to the target APD. More specifically, the driver 122 splits the data and commands specified by the application 126 into two (or more, depending on the number of APDs participating) portions, transmits one portion to the target APD and transmits the other portion to the helper APD (or the other multiple portions to the multiple helper APDs if present). The helper APD (or APDs if multiple are present) transmits that other portion to the target APD over the APD interconnect 410.

However, unlike in the technique of FIG. 5B, in the technique of FIG. 5C, instead of writing data into the local memory 406 of the helper APD, the memory controller 408 of the helper APD forwards data received from the processor 102 to the target APD. To perform this forwarding, the driver 122 configures the helper APD so that in response to receiving data from the processor 102, the helper APD forwards that data to the target APD. More specifically, the driver 122 configures the memory controller 408 of the helper APD such that certain system memory addresses map to memory locations within the local memory 406 of the target APD. Due to this mapping, when the helper APD 116 receives data directed to the certain memory addresses, the memory controller 408 forwards that data to the helper APD to write that data into the local memory 406 of the target APD at locations at which the certain memory addresses are mapped. In various examples, the driver 122 configures the helper APD to forward data in the above-described manner by setting configuration registers in the helper APD, transmitting firmware instructions, or in any other technically feasible manner.

As shown in row 570, data transfer 1 occurs during a first time. Data transfer 1 includes transferring data over an interconnect bus 404 to APD 0, the target APD. In addition, as shown in row 580, data transfer 2 occurs in a time period that overlaps with the first time in which data transfer 1 occurs. The term "overlapping" has a similar meaning as with the technique of FIG. 5B, described above. In an example, the driver 122 splits data roughly in half and transmits each half to a different one of the helper APD and the target APD so that such data is transmitted in parallel at approximately the same time. Row 570 also illustrates that after the period of time in which data transfer 1 and data transfer 2 occur, the APD processing for the data that has been transferred begins. As with the technique of FIG. 5B, in the technique of FIG. 5C, the serialized transfer of data 1 and data 2 does not occur because those two blocks of data are transferred in an overlapping period of time over two different interconnect busses 404.

Note that in FIG. 5B, the "XGMI" section (representing a copy of data from APD1 to APD0) is shown as consuming some amount of time while no corresponding time-consuming operation is illustrated in FIG. 5C. This divergence is intended to illustrate that, generally, forwarding data from APD1 to APD0 due to mapping addresses to the local memory 406 of APD0 consumes less time, or even little to no time overhead because such forwarding operations are associated with significantly less overhead than the copy operations of FIG. 5B. More specifically, the copy operations of FIG. 5B are associated with two different memory operations and require that data first be stored in the local memory 406 of the helper APD and the subsequent reading and transferring of such data to the target APD. The forwarding operation of FIG. 5C does not involve storing the transferred data into the local memory 406 of the helper APD before transmitting that data to the target APD.

Note also that although specific timing is illustrated in FIGS. 5A-5C, in actual operation, the timing would not necessarily look as illustrated. Specifically, data may "roll" into the APDs in a pipelined manner, meaning that APD processing and data transfer can occur in overlapping time periods. Additionally, although data is shown as being transferred to the target APD and the helper APD in overlapping time periods, it is possible that data is transferred not in overlapping time periods. Thus FIGS. 5A-5C are not meant to illustrate exact timing sequences. Rather, these figures are intended to illustrate that it is possible to use multiple interconnect busses 404 to transfer data to a "cluster" or "collection" of APDs at a higher rate than if only one interconnect bus 404 were used. Further, these figures are intended to illustrate that the "cluster" or "collection" of APDs is able to utilize the APD interconnect 410 to transmit the received data to a target APD for processing. Because the high-speed APD interconnect 410 coupled to the APDs 116 are faster than the interconnect busses 404, the total amount of time required for data transfer from the processor 102 to a target APD that performs work on the data can be reduced as compared with a situation that does not utilize the parallel transfer across multiple interconnect busses 410.

For either of FIG. 5B or 5C, in an example implementation, each of the interconnect busses 404 is a plurality of PCIe lanes. If data were transferred over these PCIe lanes to only one APD without using another APD, then the time for transmission of that data would be limited by the bandwidth of the PCIe lanes. By transmitting data to both APDs, additional PCIe bandwidth is leveraged for data transfer. The data transferred to the helper APD does need to be transferred to the target APD, but this transfer is accomplished over the APD interconnect 410 (which, again, may be AMD's XGMI interface or any other interface type that can transfer data between APDs 116), which is faster than the interconnect bus 404. Thus the total amount of time required for transferring data to the target APD is reduced as compared with a configuration in which no helper APD is used.

Figure 6A:
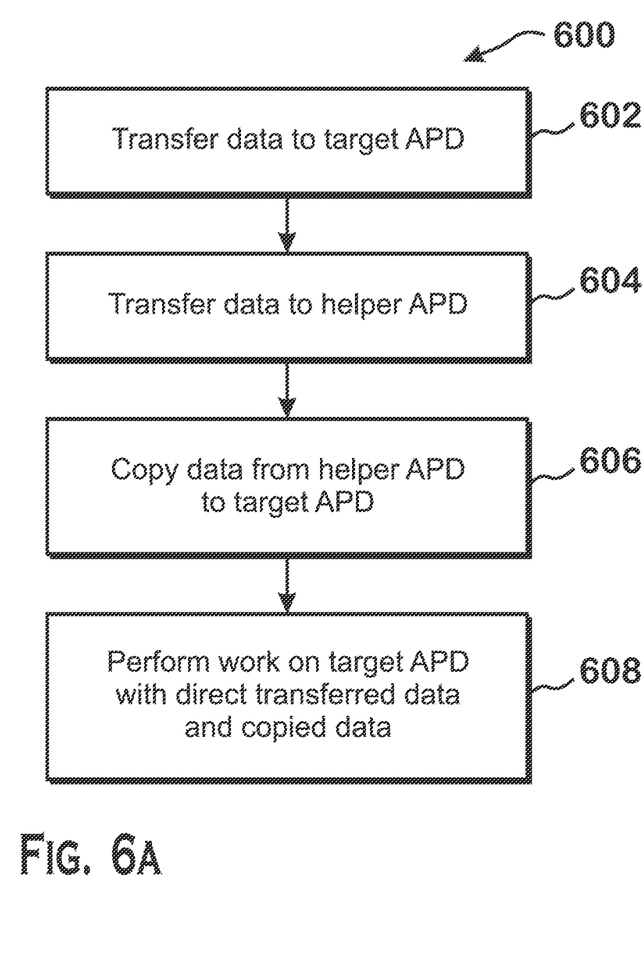
FIGS. 6A-6B are flow diagrams of example methods for transmitting data to a target APD using a helper APD.

FIG. 6A is a flow diagram of a method 600 for transmitting data to a target APD for processing using a helper APD, according to an example. Although described with respect to the system described with respect to FIGS. 1-5C, it should be understood that any system, configured to perform the steps of method 600 in any technically feasible order, falls under the scope of the present disclosure.

As shown, the method 600 begins at step 602, where the processor 102 (e.g., as directed by the driver 122) transfers data to a target APD 116. As described above, this transfer is made using an interconnect bus 404 coupled between the APD 116 and the processor 102. In some implementations, the interconnect bus 404 comprises one or more PCIe lanes and has a characteristic bandwidth dictating the data capacity per unit of time that can be transferred over the interconnect bus 404. In some implementations, the transfer of data to the target APD is performed by specifying a memory address as a target, where the memory address is mapped to a memory address of a local memory 406 of the target APD. Then, the data flows is transmitted over the interconnect bus 404 to the local memory 406.

At step 604, the processor 102 (again, e.g., at the direction of a driver 122) transfers data to the helper APD. As described above, this transfer may occur partially or fully simultaneously with the transfer of step 602. Additionally, this transfer also occurs over the interconnect bus 404. The transfer of step 604 causes the data to be stored in the local memory 406 of the helper APD.

At step 606, the helper APD copies the data received to the target APD over a high speed APD interconnect 410. At step 608, the target APD performs work with the data received from the processor 102, both directly, and indirectly via the helper APD.

Figure 6B:
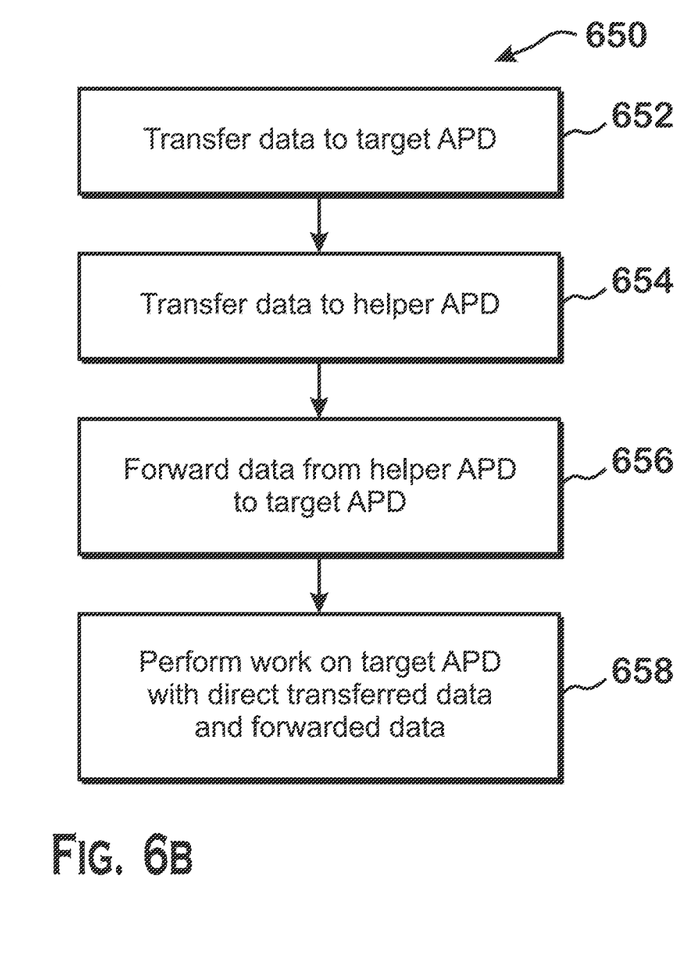

FIG. 6B is a flow diagram of a method 650 for transmitting data to a target APD for processing using a helper APD, according to another example. Although described with respect to the system described with respect to FIGS. 1-5C, it should be understood that any system, configured to perform the steps of method 650 in any technically feasible order, falls under the scope of the present disclosure.

As shown, the method 650 begins at step 652, where the processor 102 (e.g., as directed by the driver 122) transfers data to a target APD 116. As described above, this transfer is made using an interconnect bus 404 coupled between the APD 116 and the processor 102. In some implementations, the interconnect bus 404 comprises one or more PCIe lanes and has a characteristic bandwidth dictating the data capacity per unit of time that can be transferred over the interconnect bus 404. In some implementations, the transfer of data to the target APD is performed by specifying a memory address as a target, where the memory address is mapped to a memory address of a local memory 406 of the target APD. Then, the data flows is transmitted over the interconnect bus 404 to the local memory 406.

At step 654, the processor 102 (again, e.g., at the direction of a driver 122) transfers data to the helper APD. As described above, this transfer may occur partially or fully simultaneously with the transfer of step 602. Additionally, this transfer also occurs over the interconnect bus 404. The transfer of step 604 does not cause the data to be stored in the local memory 406 of the helper APD because the helper APD is configured to forward the data to the target APD due to the memory address being written to being mapped to the local memory 406 of the target APD.

At step 656, the helper APD forwards the data received to the target APD over a high speed APD interconnect 410. At step 658, the target APD performs work with the data received from the processor 102, both directly, and indirectly via the helper APD.

In some implementations, for either or both of both the techniques of FIGS. 5B and 5C (also 6A and 6B), the driver 122 monitors the bandwidth use of the interconnect bus 404 coupled to the helper APD and opportunistically uses the helper APD to transfer data to the target APD based on the monitoring. For example, responsive to detecting that some bandwidth is available on the interconnect bus 404 coupled to the helper APD, the driver 122 transmits some data that is destined for the target APD to the helper APD for subsequent transmission (whether by the copy-twice technique or the forwarding technique) to the target APD. When no bandwidth is available, the driver 122 does not perform this operation. As more bandwidth becomes available, the driver 122 may transmit more data to the helper APD for transmission to the target APD and may reduce the amount of data transmitted to the helper APD in response to detecting that less bandwidth is available. The technique of opportunistically using available bandwidth of a helper APD to increase effective bandwidth of a target APD may be used for read, write, or bi-directional transfers. In addition, although sometimes described herein as involving two APDs 116—a helper APD and a target APDs, the technique may be used with more than two APDs 116, with multiple APDs 116 serving as "helper" to a single target APD. Additionally, it is not necessary for any particular APD 116 to be statically designated as a helper APD or target APD. In an example, the driver 122 monitors bandwidth across the interconnect busses 404. In an example, if the driver 122 detects that there is spare bandwidth over an interconnect bus 404 to a particular APD 116 that has an APD interconnect 410 connection to a target/source APD for which there is data to be written to or read from, the driver 122 causes at least some of the data to be written to or read from the target/source APD via the interconnect bus 404 having spare bandwidth and the helper APD associated with that interconnect bus 404. The driver 122 can cause data to be transferred using multiple helper APDs with spare bandwidth in this manner.

In the disclosure provided herein, various references are made to transferring data from a processor (e.g., processor 102) as the source to a "target APD" as the destination. Thus, the techniques described herein are used to write data from a processor to an APD 116. The techniques described herein could also be used to read data from an APD 116. For reads, the above-described technique would be reversed. More specifically, to read data from an APD 116 using paths other than the direct connection between the APD 116 and the processor 102, the processor 102 would transmit a request to read data to a target APD 116. Then, the target APD 116 would transmit at least some of the requested data to the processor 102 indirectly, through a helper APD 116 in a manner consistent with the techniques described elsewhere herein. More specifically, the helper APD 116 may either be configured to copy data received from the source APD 116 to the memory associated with the processor 102 (e.g., system memory 104) in a manner analogous to the technique illustrated in FIG. 6A or to forward data received from the source AP 116 to the memory associated with the processor (e.g., system memory 104) in a manner analogous to the technique illustrated in FIG. 6B. Reading and writing data according to the above method may occur simultaneously or non-simultaneously.

In addition, although the technique provided herein has been described as being performed using the APDs 116 described herein as an example, the technique may also be extended to be performed by devices other than APDs 116. The techniques may be used by any device capable of transferring data in accordance with the techniques described herein.

In any of the techniques described herein, data that is transferred to a target APD 116 from the processor 102 or to the processor 102 from a source APD 116 may originate from a single buffer or from multiple buffers. In an example, a "single buffer" means a single contiguous portion of memory into which the results of a particular operation or related set of operations is placed. Multiple buffers thus means multiple different portions of memory that may or may not be contiguous to each other and that store data generated as the result of multiple types of operations or that store data of a different types generated by a single type of operations. In determining how to send data in a parallel manner to different APDs, the driver 122 may sending data from different buffers to different APDs for transmission to the target APD or may split up individual buffers and send different portions of split up buffers to the target APD via different APDs. Although described as a transmission to an APD, the above data division technique applies for read operations as well. In other words, the driver 122 may control a source APD to divide a single buffer into multiple parts for transmission to the processor 102 via different routes (e.g., directly through the interconnect bus 404 and indirectly through one or more APD interconnects 410) and/or may cause the source APD to maintain the integrity of each buffer and not split up buffers but to transmit data from different buffers to the processor 102 through different routes (again, e.g., directly through the interconnect bus 404 and indirectly through one or more APD interconnects 410).

Regarding breaking up buffers, the driver 122 may use any of a variety of factors to determine whether to break up buffers, as well as to determine how to transmit different portions of a broken up buffer. Specifically, the driver 122 may determine that overhead associated with splitting up a buffer is too great for the buffer to be split up, and, in that instance, does not cause buffers to be broken up. Again, as described above, the driver 122 monitors the spare bandwidth over the various busses (e.g., interconnect busses 404 and APD interconnect 410) to identify spare bandwidth to use to increase the effective bandwidth for a transfer between an APD and the processor.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for transmitting first data between a processor and a first device, the method comprising:
    transmitting a first portion of the first data from the processor to the first device via a first interconnect between the first device and the processor;
    in response to spare bandwidth existing between the processor and a second device, transmitting a second portion of the first data from the processor to the second device via a second interconnect between the second device and the processor; and
    in response to the spare bandwidth existing between the processor and the second device, causing the second portion of the first data to be transmitted from the second device to first device via a third interconnect between the first device and the second device,
    wherein the third interconnect is independent of the first interconnect and the second interconnect.

2. The method of claim 1, wherein:
    transmitting the first portion to the first device occurs at least partially simultaneously with transmitting the second portion to the second device.

3. The method of claim 1, wherein:
    transmitting the second portion to the second device occurs at least partially simultaneously with transmitting the first portion to the second device.

4. The method of claim 1, wherein the transmitting of the second portion from the second device to the first device comprises:
    forwarding the second portion by the second device to the first device.

5. The method of claim 4, wherein forwarding the second portion to the first device comprises:
    in response to detecting that a memory location associated with the second portion is mapped to the first device, and in response to receiving the second portion, transmitting the second portion to the first device.

6. The method of claim 1, wherein the transmitting of the second portion from the second device to the first device comprises:
    copying the second portion from a local memory of the second device to the first device.

7. The method of claim 1, further comprising:
    processing the first portion and the second portion by the first device.

8. The method of claim 1, wherein;
    the transmitting occurs in response to one of a read request by the processor or a write request by the processor.

9. The method of claim 1, further comprising:
    opportunistically identifying times at which to transmit the second portion to the second device based on available bandwidth of the second interconnect.

10. A system for transmitting data between a processor and a first device utilizing a first interconnect between the processor and the first device, a second interconnect between the processor and a second device, and a third interconnect between the first device and the second device, the system comprising:
    the first interconnect;
    the third interconnect; and
    the first device, configured to:
        receive a first portion of the first data from the processor via the first interconnect; and
        receive a second portion of the first data from the processor via the third interconnect, wherein, in response to spare bandwidth existing between the processor and the second device, the second portion of the first data is transmitted from the processor the second device via the second interconnect and from the second device to the first device via the third interconnect,
    wherein the third interconnect is independent of the first interconnect and the second interconnect.

11. The system of claim 10, wherein:
    the first portion is transmitted from the processor to the first device at least partially simultaneously with the second portion being transmitted to the second device.

12. The system of claim 10, wherein:
    the second portion is transmitted to the second device at least partially simultaneously with the first portion being transmitted to the second device.

13. The system of claim 10, wherein the second portion is forwarded by the second device to the first device.

14. The system of claim 10, wherein the second portion is copied from local memory of the second device to the first device.

15. The system of claim 10, wherein the first device is further configured to process the first portion and the second portion by the first device.

16. The system of claim 10, wherein the receiving occurs in response to one of a read request by the processor or a write request by the processor.

17. A non-transitory computer-readable medium storing instructions that, when executed by a processor, cause the processor to transmit first data to a first device, by:
    in response to spare bandwidth existing between the processor and a second device, transmitting a first portion of the first data to the first device via a first interconnect between the first device and the processor;
    in response to the spare bandwidth existing between the processor and the second device, transmitting a second portion of the first data to the second device via a second interconnect between the second device and the processor; and
    causing the second portion of the first data to be transmitted from the second device to first device via a third interconnect between the first device and the second device,
    wherein the third interconnect is independent of the first interconnect and the second interconnect.

18. The non-transitory computer-readable medium of claim 17, wherein:
    transmitting the first portion to the first device occurs at least partially simultaneously with transmitting the second portion to the second device.

19. The non-transitory computer-readable medium of claim 17, wherein:
   transmitting the second portion to the second device occurs at least partially simultaneously with transmitting the first portion to the second device.

20. The non-transitory computer-readable medium of claim 17, wherein the instructions further cause the processor to:
   opportunistically identify times at which to transmit the second portion to the second device based on available bandwidth of the second interconnect.

\* \* \* \* \*